March 31, 1953  F. R. SCHMITT  2,632,985
BREAD WRAPPING
Filed May 16, 1946  2 SHEETS—SHEET 2
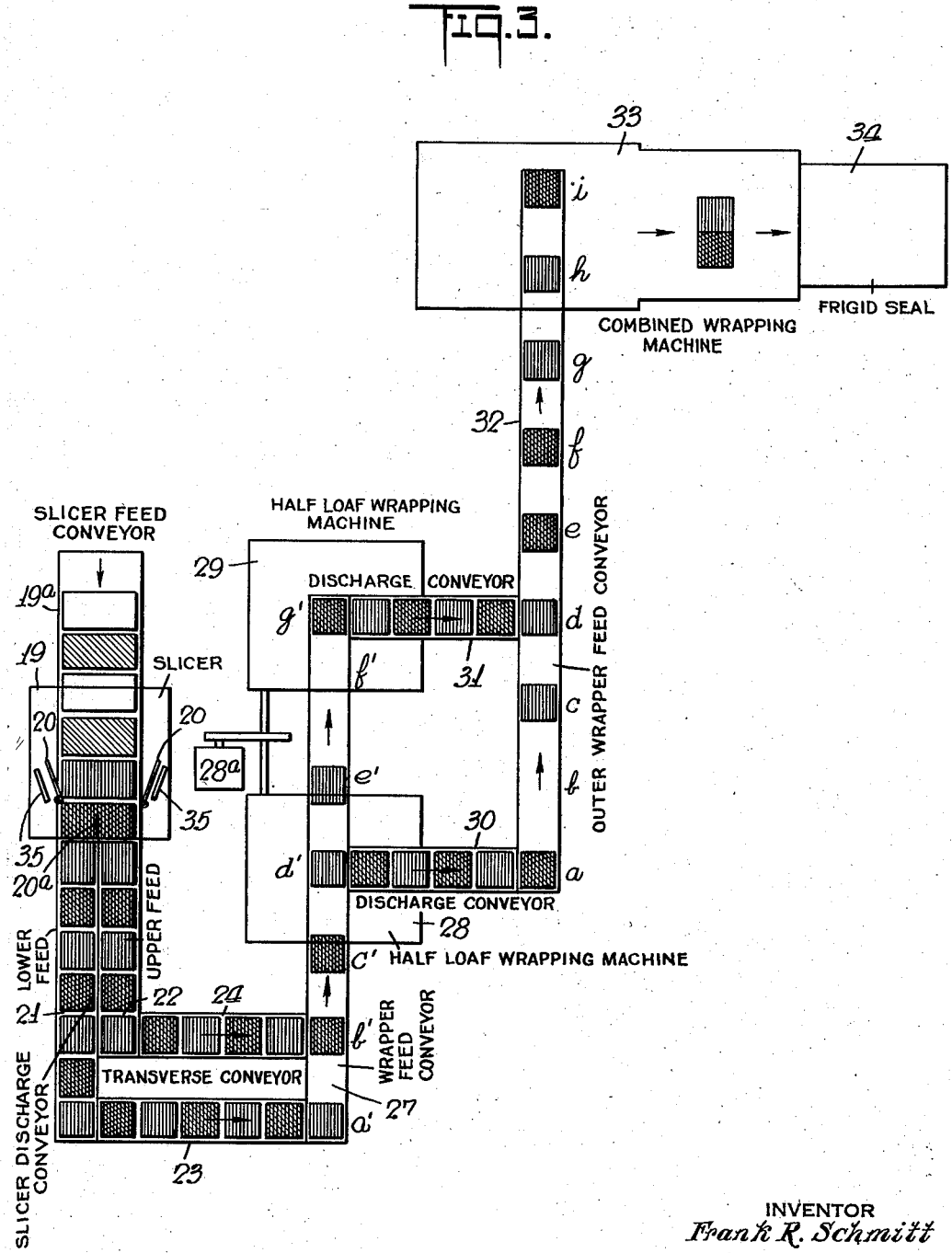

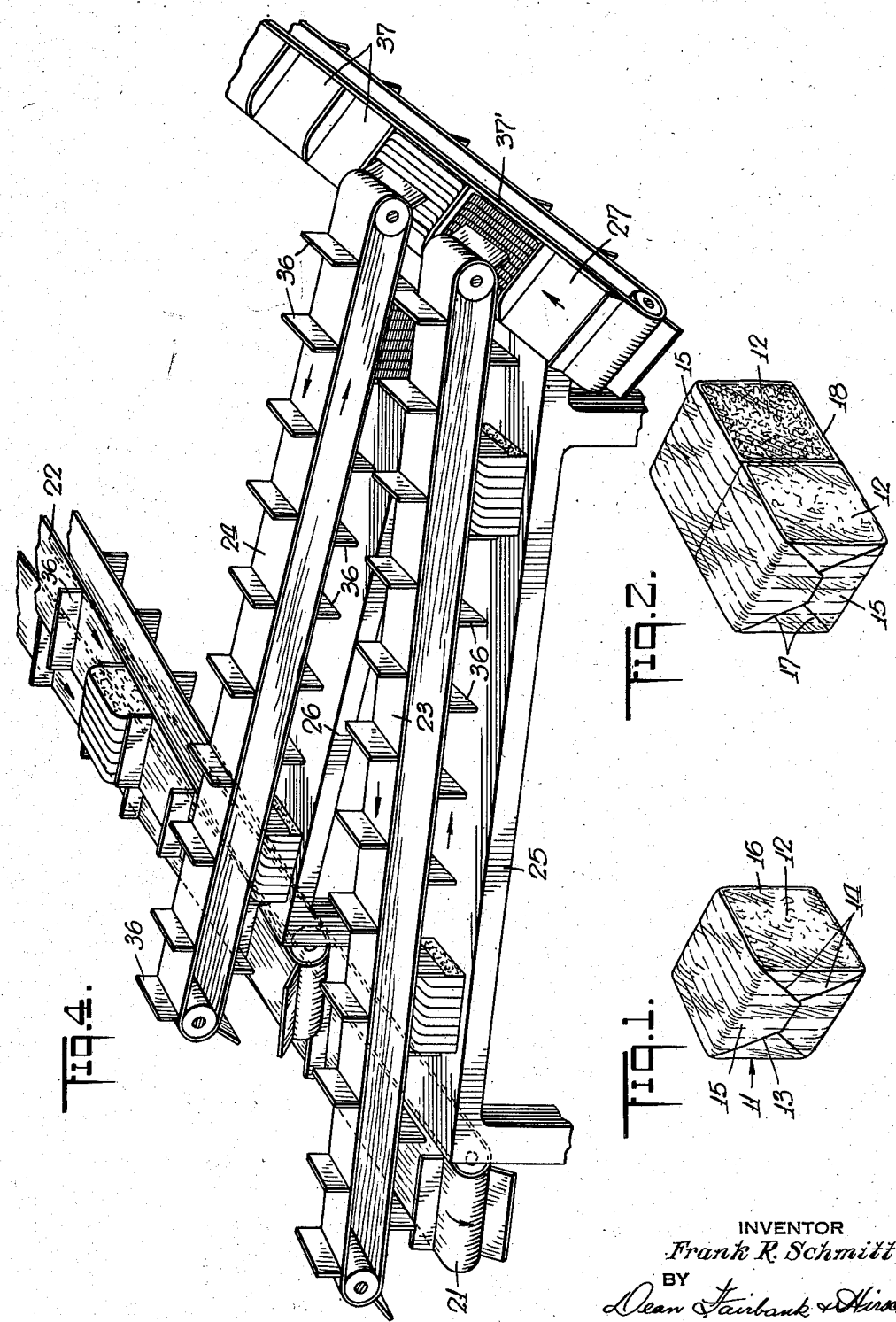

Patented Mar. 31, 1953

2,632,985

UNITED STATES PATENT OFFICE 2,632,985

BREAD WRAPPING

Frank R. Schmitt, Queens Village, N. Y., assignor, by mesne assignments, to American Machine & Foundry Company, a corporation of New Jersey Application May 16, 1946, Serial No. 670,100

4 Claims. (Cl. 53—66)

The present invention relates to the art of bread packaging.

It is an object of the invention to provide a bread package in which the texture of the bread is exposed to view without detracting from the complete efficacy of the wrapper or seal as a protection against dirt, dust and handling.

Another object is to provide a package of the above type containing a variety of smaller packages of the same or diverse types of bread affording the exposure to view and the protection above noted.

Another object is to produce expeditiously the novel packages above referred to by a system involving appropriate correlation of conventional bread slicing units and any conventional bread wrapping units now on the market.

According to the invention, completed portions of bread are passed through a conventional slicing machine, the crust ends are removed and the slices are selectively advanced by a system of conveyors to be presented to a conventional wrapping machine in direction departing from the conventional, so that the faces of the slices will be at right angles to the end folds of the wrapped packages.

In one preferred embodiment, portions of bread of two varieties are alternately fed into the slicing machine and a conveyor system separates the sliced portions into two stacks of slices and advances the stacks to conventional wrapping machines which in turn deliver the wrapped stacks of the two types of bread to a third conventional wrapping machine which puts an outer wrapper on pairs of previously wrapped stacks, said outer wrapper having its folds on the crust ends of the combined package and its smooth portion on the crumb side thereof.

The claims to a bread package as an article of manufacture are the subject of a continuation-in-part of application, Serial No. 782,483, filed October 28, 1947.

In the accompanying drawings in which are shown one or more of the various possible embodiments of the several features of the invention, Fig. 1 is a perspective view of a package of the present invention containing a single stack of slices, Fig. 2 is a view, similar to Fig. 1, of a combined package containing two wrapped stacks of slices, Fig. 3 is a diagrammatic plan view showing the wrapping and conveyor system, and Fig. 4 is a schematic perspective view of the conveyor system.

Referring now to the drawings, the package shown in Fig. 1 comprises a substantially square-ended portion of bread 11 preferably sliced with the crust ends removed, thereby exposing the crumb portion 12 of the bread at opposite ends thereof. Wrapped about the bread is a rectangular sheet of transparent material 13, preferably of "cellophane" or waxed paper, so that the folds 14 of the wrapping material are on the crust side 15 of the bread, while the smooth portion 16 of the wrapper is on the crumb ends 12 of the bread, thereby exposing said ends and affording a clear view of the texture and the quality of the bread.

The combined package shown in Fig. 2 comprises a plurality of substantially square-ended portions of bread, each individually wrapped in the manner above described. Although it is possible to have two or more portions of bread in the combined package, in the embodiment shown in Fig. 2, there are two portions arranged so that the crust ends 15 of the slices are longitudinally aligned. A transparent wrapper encloses the individually wrapped portions so that the folds 17 of the combined wrapper are on the crust ends 15 of the combined package while the smooth portion of the wrapper 18 is on the crumb sides 12 of the combined package, which are in side by side relation as shown, lengthwise of the package.

The system may include a number of bread packaging machines and conveyor belts and comprises (a) a conventional bread slicer 19 with means thereon, schematically shown at 20, for removing, as by kicking out, the crust ends 35 of the sliced bread, (b) a conveyor belt 19a for feeding said slicing machine, (c) a slicer discharge consisting of a pair of conveyor belts 21 and 22, (d) a transverse conveyor consisting of conveyor belts 23 and 24 and tables 25 and 26 respectively, beneath said belts and parallel thereto, (e) a wrapper feed conveyor 27, (f) two wrapping machines 28 and 29, (g) a discharge conveyor from said wrapping machines consisting of conveyor belts 30 and 31, (h) an outer wrapper feed conveyor 32, (i) a combined wrapping machine 33, and (j) means to drive said conveyor belts and wrapping machines as at 28a.

Referring to Figs. 3 and 4, there is shown a preferred embodiment of this invention which includes a slicer feed consisting of a conveyor belt 19a, a conventional bread slicer 19 for slicing the bread into a stack of slices with suitable means 20 thereon for removing the crust ends 35 of the sliced bread by kicking them out as diagrammatically suggested, and means at the output of said slicer schematically shown at 20ª to split the stack of slices into two stacks of slices, said means preferably consisting of a thin blade or sheet portion so mounted on said slicer that it registers accurately with the slice cut at the center of the stack of slices. Longitudinally aligned with said slicer is a slicer discharge consisting of a feed or conveyor belt 22 with an upward inclination, designated the upper feed belt and a feed or conveyor belt 21 which may feed in a horizontal plane and is designated the lower feed belt. One of said belts, desirably the lower, is of greater length than the other. The conveyor belts carry spaced, vertical pusher vanes 36 which have the dual function of properly spacing the stacks of slices of bread on the conveyor and of pushing the stacks to the succeeding operating position.

At right angles to the slicer discharge conveyor is the transverse feed comprising conveyors 23 and 24 and tables 25 and 26. Upper feed belt 22 delivers its stacks to table 26 and lower feed belt 21 delivers its stacks to table 25. Conveyor belts 24 and 23 are parallel to and above said tables respectively, and have their respective receiving ends contiguous to the discharge ends of the feed belts 21 and 22. Upper feed belt 22 is upwardly inclined in order to allow the pusher vanes 36 and other mechanisms of the belt to clear the component parts of horizontal conveyor belt 23 and table 25. Conveyor belt 24 which transports the stacks received from upper feed belt 22, is shorter than horizontal conveyor belt 23 which transports the stacks received from lower feed belt 21. This can best be seen in Fig. 4.

Vanes 36 on the underside of conveyor belts 23 and 24 slide the stacks along tables 25 and 26 respectively and simultaneously discharge stacks from off the aligned ends of the tables on to wrapper feed conveyor 27, which consists of a laterally tilted conveyor belt placed at right angles to said transverse feed.

Wrapper feed 27 contains spaced sections 37, each of which carries a stack of slices and transports this stack to the wrapping machines 28 and 29.

Since unlike conventional practice the stack of slices is fed into the wrapping machines with the stack of slices longitudinally rather than transversely of the wrapper sheet and with the crumb faces of the stacks cross-wise of said wrapper sheet, the folds of the wrapper will form on the crust side of the stack and leave the crumb ends of the stack exposed to view through a single ply of wrapper unobstructed by folds.

The conveyor system is so designed that it will transport stacks of slices of bread from the output of the slicing machine to enter the wrapping machines by movement of the stack of slices so that they are arranged longitudinally rather than transversely of the rectangular sheet of wrapping paper used by said wrapping machines, and present stacks of slices of bread to each of the wrapping machines 28 and 29.

The output of each wrapping machine is a wrapped package containing a portion of bread, preferably sliced with its crust ends removed. By reason of the manner of presenting the bread to the wrapping machine, the wrapper which preferably is of transparent material becomes arranged about the bread so that its folds are on the crust side of the bread and its smooth portion about the exposed crumb end of the bread, and the package is sealed to prevent the entry of dirt and dust.

In order for the seal which is placed on the folds of the wrapper to congeal, it is necessary to either allow time for the cooling to take place or provide a device that will rapidly cool the seal by artificial means. In the embodiment shown, the ouput from the wrapping machines is fed to a discharge conveyor which is relatively slow in movement, thereby allowing sufficient cooling time.

It may be desirable to assemble a package containing several individually wrapped stacks of slices of bread. To achieve this result, the wrapped output of the wrapping machines is fed by the discharge conveyor which consists of a pair of conveyor belts 30 and 31 at right angles to the wrapping feed 27 and which deliver their respective loads to outer wrapper feed 32 which consists of a conveyor belt at right angles to the discharge conveyor, said outer wrapped feed 32 containing spaced sections, $a$, $b$, $c$, $d$, etc. diagrammatically shown in Fig. 3, each of which carries a stack of slices of bread and transports this bread to the combined wrapping machine 33 of conventional type.

In the embodiment shown, two stacks of slices of bread are presented to the combined wrapping machine so that a crust side of one is in contact with a crust side of the other and the two stacks of slices are transversely juxtaposed across the rectangular wrapping paper with the crumb faces of said stacks of slices cross-wise of said wrapping paper. By reason of the manner of presenting the bread to the combined wrapping machine 33, there results a combined package with the folds of the outer wrapper on the crust ends thereof, and the smooth portion of the wrapper on the crumb sides, which latter are aligned side by side and exposed to view along the length of the combined package.

The combined package is fed to frigid seal 34 which quickly congeals the seal at the fold ends of the wrapper in manner well understood and this dispenses with the need for additional conveyor length.

*Operation*

The portions of bread are placed on slicer feed 19ª and delivered to slicing machine 19 where each portion is sliced onto any desired thickness of slice. The end slices are kicked off by kickers 20, thereby exposing the crumb face 12 at each end of the bread.

The stack of slices is split into two portions or stacks of slices by the means schematically shown at 20ª which preferably consists of a vertical blade or sheet so mounted that it registers accurately with a slice cut in the middle of said stack and then enters the slicer discharge conveyor which transports each of the two stacks of slices, conveyor belt 21 taking one of said stacks and conveyor belt 22 taking the other of said stacks, the two stacks being separated by reason of the upward inclination of conveyor belt 22 relative to belt 21, to lift its load and thereby also clear the rollers and vanes of the horizontal conveyor 23.

The bread from conveyors 21 and 22 is delivered to tables 25 and 26 respectively and is pushed along these tables by the vanes 36 on the underside of transverse conveyor belts 23 and 24 parallel to said tables 25 and 26 respectively, and stacks of slices on the respective belts are simultaneously discharged from the aligned ends of the tables on to wrapper feed conveyor 27 at right angles to said transverse conveyor belts.

By reason of the transverse inclination of conveyor 27, the slices stack by gravity against ledge 37' of said conveyor, said ledge being stationary. The stacks of slices of bread are presented to the conventional wrapping machines 28 and 29, by the feed 27 therefor, in such a position, as a result of the conveyor system recited, that the stacks of slices will enter the wrapping machine arranged longitudinally rather than transversely of the rectangular sheet of wrapping paper, thereby causing the folds of the wrapper to be on the crust side of the half loaf of bread and the smooth portion of the wrapper on the exposed crumb ends thereof.

The output of the wrapping machines is fed to the discharge conveyor belts 30 and 31 and the wrapped stacks of slices or packages are ready for distribution.

It might be desirable to bake the bread in portions equal in size to one of the two stacks of slices, in the first instance, in which case the output of the slicer could be fed directly into a wrapping machine longitudinally aligned with said slicer.

The present construction could also be easily adapted for use with an unsliced bread with both its ends removed, or with a bread having only one end removed, thereby exposing the crumb portion thereof at one end only.

Although, in the embodiment shown, two wrapping machines are used to increase the speed of production as the slicing operation and the splitting of the bread into two portions is faster than the wrapping operation, where the finished product is the packages of Fig. 1, one wrapping machine could be used.

Where it is desired to assemble two or more packages of bread in one wrapper as shown in Fig. 2, the output of wrapping machines 28 and 29 is delivered respectively by conveyor belts 30 and 31 to outer wrapper feed 32 which leads into the combined wrapping machine 33. The outer wrapper feed is at right angles to the discharge conveyors 30, 31, and feeds a plurality of stacks of slices of bread to the combined wrapping machine so that two stacks are side by side, each longitudinally of the rectangular wrapping paper used by said wrapping machine with the crumb faces of said stacks cross-wise of said wrapping paper. The conventional mode of wrapping performed by the combined wrapping machine, as previously indicated, will enclose the individually wrapped stack of slices so that the folds of the combined package are on the crust ends of the package while the smooth portion of the wrapper is on the crumb faces thereof as shown in Fig. 2, thereby affording an unobstructed view of the crumb portion of the bread.

The assembled package then passes through frigid seal 34 which quickly congeals the seal thereon and the package is now ready for distribution.

*Composite package with diverse types of bread*

The system described herein makes it possible to have a plurality of individually wrapped stacks of slices of bread each of distinct composition in a single package, so wrapped that the exposed crumb portion of each stack is visible.

If for example, portions of white and rye bread are alternately fed to the bread slicing machine by conveyor 19ª, the output of said slicing machine would be fed to slicer discharge conveyor 21, 22. Since conveyors 21 and 23 are longer than conveyors 22 and 24, respectively, the stacks of slices of bread of similar type which are transversely aligned when fed to conveyors 21 and 22 become out of phase on conveyors 23 and 24. The conveyor belt 21 extends beyond belt 22 by the width of approximately two stacks of slices, thereby causing stacks of slices of bread of diverse types to become transversely aligned on said conveyors 23, 24, which results in a stack of slices of rye bread and a stack of slices of white bread being discharged simultaneously from conveyors 23, 24 onto adjacent sections of feed 27 for the wrapping machines. This can be seen in Figs. 3 and 4.

Feed 27 moves intermittently in steps of two sections with respect to the discharge ends of the transverse conveyors 23, 24 so that two empty sections 37 of said feed will be available at each discharge of the transverse conveyors 23, 24 and all of the sections of said feed 27 will be filled. The wrapping machines 28, 29 are so arranged with respect to said feed that wrapping machine 28 will take the stacks placed on said feed 27 by conveyor 24 and wrapping machine 29, placed three sections further along said feed 27 will take the stacks placed on said feed by conveyor 23, thereby enabling each of said wrapping machines to wrap stacks of rye bread and stacks of white bread alternately.

Referring to Fig. 3, to illustrate the above action, when the wrapping system is in operation, stacks of bread of diverse types will be transversely aligned on transverse conveyors 23, 24 and each of said transverse conveyors will alternately discharge stacks of white and rye bread; a stack of white bread and a stack of rye bread, or a stack of rye bread and a stack of white bread being discharged simultaneously by the pair of conveyors 23, 24 onto adjacent sections *a', b',* respectively of wrapper feed 27.

The intermittent stepping motion forward of the wrapper feed 27 will move successive stacks of rye and white bread, or white bread and rye bread, delivered by transverse conveyor 24, from *b'* to *d'* where the stacks are wrapped in sequence by wrapping machine 28. The output from transverse conveyor 23 passes from *a'* to *c'* to *e'* thence to *g'* in successive steps of conveyor 27, and is wrapped at *g'* by wrapping machine 29. It will be clear that after the system is in operation, wrapping machine 28 will wrap a stack of rye bread at the same time that wrapping machine 29 will wrap a stack of white bread and vice versa.

It is obvious that wrapping machine 28 is the terminal on conveyor 27 for the output of conveyor 24, and wrapping machine 29 is such terminal for the output from conveyor 23, and no bread from the respective conveyors 23, 24, will pass beyond their respective terminals. Position *f'*, it will be clear, is at all times empty.

The output from the wrapping machines 28, 29 is conveyed by the discharge conveyors 30, 31, respectively, to outer wrapper feed 32 for the combined wrapping machine 33.

As it has been already shown that after the system is in operation, wrapping machine 28 will wrap a stack of rye bread at the same time that wrapping machine 29 will wrap a stack of white bread and vice versa, it is clear that stacks of slices of white bread and rye bread will be transversely aligned on discharge conveyors 30, 31 and that each of said conveyors will alternately discharge stacks of slices of white and rye bread; a stack of slices of rye bread and a stack of slices of white bread or a stack of slices of white bread and a stack of slices of rye bread being discharged simultaneously by the pair of discharge conveyors 30, 31 onto positions *a* and *d*, respectively of feed 32.

Feed 32 moves intermittently two sections at a time with respect to the discharge ends of the discharge conveyors 30, 31 and the discharge conveyors are so arranged with respect to said feed that each discharges its stacks of slices in sequence, not upon consecutive but upon alternate sections of said feed, thereby presenting a combination consisting of a stack of slices of rye bread and a stack of slices of white bread, or a stack of slices of white bread and a stack of slices of rye bread alternately to the combined wrapping machine.

Referring again to Fig. 3, to illustrate the above action, the intermittent stepping motion forward of the outer wrapper feed 32 will move successive stacks of slices of rye and white bread or white and rye bread from discharge conveyor 30, from *a* to *c* to *e* to *g* and thence to *i*. The output from discharge conveyor 31, which also alternates in composition, will be delivered to position *d* three sections further along the feed from position *a* and then passes from *d* to *f* to *h*. Position *i* is the terminal on conveyor 32 for the output of conveyor 30 and position *h* is such terminal for the output from conveyor 31.

It is apparent, therefore, that after the system is in operation, when a stack of slices of white bread is at position *i*, a stack of slices of rye bread will be at position *h*, and vice versa. Positions *h* and *i* are both within the combined wrapping machine 33, which encloses these two different stacks of slices in one package in the manner heretofore described, so that the folds of the combined package are on the crust ends of the stack of slices and the smooth portion on the crumb faces thereof.

The system described herein uses a single slicing machine and a minimum number of wrapping machines, all of conventional construction to achieve the desired result, whereby two stacks of slices of bread of distinct composition may be enclosed in one wrapper.

As many changes could be made in the above system and package, and many apparently widely different embodiments of this invention could be made without departing from the scope of the claims, it is intended that all matters contained in the above description or shown in the accompanying drawings shall be interpreted as illustrative and not in a limiting sense.

Having thus described my invention, what I claim as new and desire to secure by Letters Patent of the United States is:

1. A system for wrapping bread, comprising a conventional slicing machine to form a stack of slices, means for removing the crust ends of such stack, means for separating such stack into two stacks of slices, two conventional wrapping machines, one for each of such two stacks, said machines each being of the type which forms end folds for the package by bending the lateral edges of the length of wrapping material, longitudinal conveyer means for receiving stacks from the slicing machine and forwarding the same sidewise, a pair of parallel transverse conveyer means coacting with said longitudinal conveyer means for receiving stacks therefrom and forwarding the same lengthwise, and a single wrapper feed conveyer means for receiving the stacks from the pair of transverse conveyer means and feeding such stacks sidewise alternately into the respective wrapping machines so as to extend longitudinally of the wrapping material of the respective wrapping machines with the crumb faces of such stacks extending crosswise of the wrapping material, whereby the lateral edges of the wrapping material will be folded over the crust sides of the stacks.

2. A system for wrapping bread comprising a conventional slicing machine to form stacks of slices, means for removing the crust ends of such stacks, means for separating each of such stacks into two stacks of slices, said means comprising a pair of conveyer belts longitudinally aligned with said bread slicer and receiving such two stacks of slices respectively with their crumb faces extending lengthwise of said belts, one of said conveyer belts feeding to a higher level than the other, a transverse conveyer comprising two conveyer belts lying in corresponding planes at right angles to said first named pair of conveyer belts and receiving stacks therefrom respectively with their crumb faces extending cross-wise of said belts, a conveyer belt at right angles to said transverse conveyer and receiving stacks therefrom with the crumb faces of said stacks extending lengthwise of said last named conveyer belt, a pair of conventional wrapping machines fed by said last named conveyer belt, said machines each being of the type which forms end folds for the package by bending the lateral edges of the length of wrapping material, said last named conveyer belt presenting such stacks of slices thereon so as to extend longitudinally of the wrapping material with the crumb faces of such stacks extending cross-wise of the wrapping material, whereby the lateral edges of the wrapping material will be folded over the crust sides of the stacks, and a pair of discharge conveyer belts each longitudinally aligned with one of said wrapping machines and at right angles to the conveyer belt feeding said pair of wrapping machines.

3. The combination set forth in claim 2 in which means are provided for alternately feeding bread of two types to said slicing machine, said conveyer belts longitudinally aligned with said bread slicer and said transmission conveyer belts being so arranged that stacks of slices of different types become transversely aligned on said transverse conveyer belts, and in which the conveyer belt for said wrapping machines has an intermittent stepping motion forward, moving two sections at each step with respect to the discharge ends of said transverse conveyer, and simultaneously presenting stacks alternating in type to each of said wrapping machines.

4. The combination set forth in claim 3 in which an additional conventional wrapping machine is provided of the type which forms end folds for the package by bending the lateral edges of the length of wrapping material and in which a feed conveyer having a plurality of sections is provided for said additional wrapping machine at right angles to said discharge conveyers, said discharge conveyers being so arranged with respect to said feed conveyer that each discharges its load in alternate sections of said feed conveyer, said feed conveyer having an intermittent stepping motion forward, whereby it moves two sections at each step with respect to the discharge ends of said discharge conveyers, said feed conveyer presenting pairs of individually wrapped stacks to said additional wrapping machine with the stacks in side-by-side relation transversely aligned across the wrapping material with each stack extending longitudinally of the wrapping material so that the combined package will have its folds on the crust ends of the pair of stacks with the smooth area of the wrapper on the crumb faces thereof.

FRANK R. SCHMITT.

REFERENCES CITED

The following references are of record in the file of this patent:

UNITED STATES PATENTS

| Number | Name | Date |
|---|---|---|
| 1,085,260 | Holden et al. | Jan. 27, 1914 |
| 1,969,004 | Hartman | Aug. 7, 1934 |
| 2,247,401 | Papendick | July 1, 1941 |
| 2,247,675 | Thum | July 1, 1941 |
| 2,247,695 | Papendick | July 1, 1941 |
| 2,260,324 | Kottmann | Oct. 28, 1941 |
| 2,332,316 | Hexter et al. | Oct. 19, 1943 |
| 2,408,317 | Jones | Sept. 24, 1946 |
| 2,441,513 | Schmitt | May 11, 1948 |